Inventor
Robert U. Garrett

By Albin F. Knight
Attorney

Aug. 2, 1938.   R. U. GARRETT   2,125,672
APPARATUS FOR GENERATING OZONE
Filed Oct. 6, 1936   2 Sheets-Sheet 2
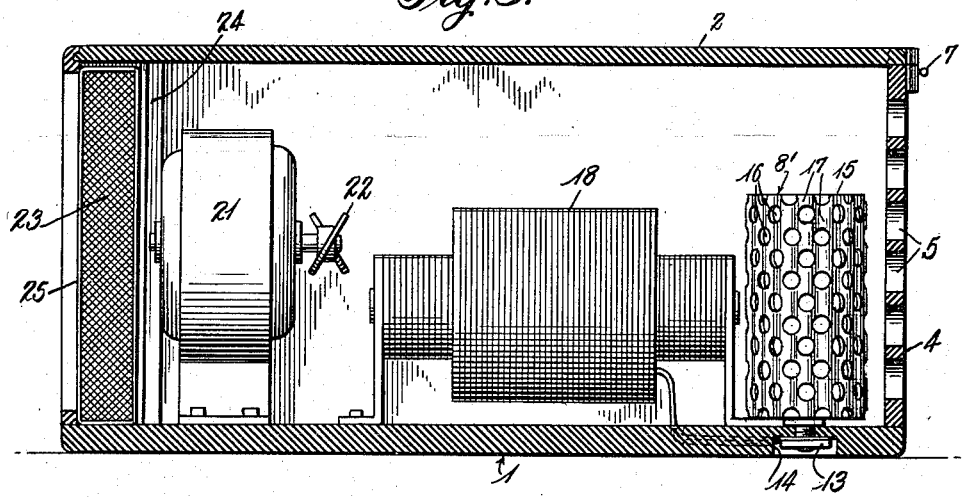
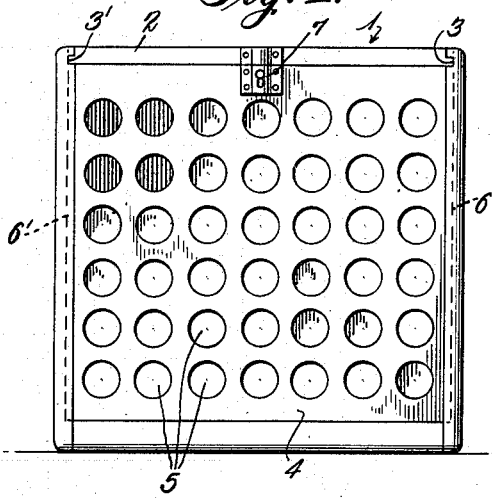
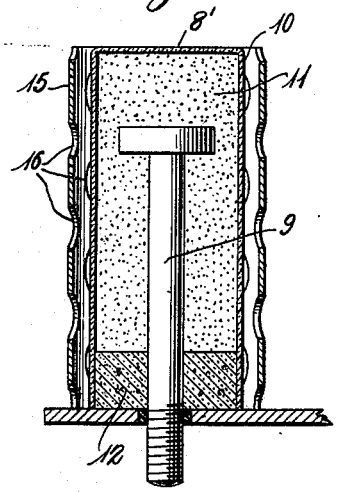
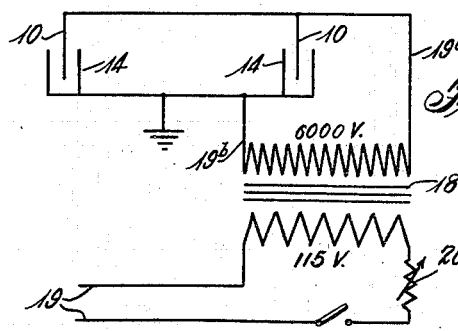
Inventor
Robert U. Garrett
By Albin F. Knight
Attorney Patented Aug. 2, 1938

2,125,672

UNITED STATES PATENT OFFICE 2,125,672

APPARATUS FOR GENERATING OZONE

Robert U. Garrett, Enka, N. C.

Application October 6, 1936, Serial No. 104,261

3 Claims. (Cl. 204—32)

The present invention relates to an apparatus for generating ozone and more particularly to a portable type device which is extremely compact and light in weight to thereby render the same adaptable for a variety of uses including some not permissible with larger machines.

The principle of ozone generation and the manufacture of ozonized air by means of an electric current is well known in the art and has been practiced with various kinds of apparatus. Ozone is a powerful oxidizing agent and acting in such a capacity has various and sundry uses. Among other uses, it has a definite function in contributing to sanitation and the purification of air by oxidizing impurities and contaminations such as smoke, fumes, fine dust, and living bacterial organisms.

In practical application ozone generators may be employed in almost every phase of business and home life, for instance in factories where obnoxious fumes and smokes are evolved during the normal operation of various chemical processes. In the conditioning of air in large office buildings ozone is an important contributing factor to the health and comfort of persons thereof, and in homes ozone has come to be regarded as essential in order to provide proper sanitary air conditions. Generally ozone has been found effective to purify and deodorize the air in laboratories, rest rooms, kitchens, smoking rooms, garages, and miscellaneous other places.

The importance and use of ozone has grown in such unprecedented proportions that the demand for practical and economical apparatus is a logical result. Most ozone generators which are in use at present are large and cumbersome, and the various elements thereof are so constructed that the machine as a whole is entirely unsatisfactory for many purposes both from the standpoint of economy and adaptability.

It is, therefore, the object of the present invention to provide a portable device which is relatively light in weight and inexpensive to manufacture and operate, and which at the same time may be successfully employed for every use indicated.

Another object of this invention is the provision of an improved ozone generator which is relatively simple in construction, the various parts thereof being readily accessible and adapted to be cleaned or replaced without inconvenience.

It is a further object of the present invention to provide a device which may be readily transported and used in places where a larger equipment would be impossible or undesirable.

It is further contemplated to provide a generator having a larger capacity for generation of ozone than has hitherto been obtainable with many larger machines, and to regulate said generation to permit the economical manufacture of the desired amount.

Other objects and advantages will be apparent from the following detailed description when considered in connection with the accompanying drawings wherein Fig. 1 is a perspective view of an ozone generator constituting one form of the invention;

Fig. 3 is a sectional view taken on the line 3—3 of Fig. 2;

Fig. 4 shows a right end view of the generator shown in Fig. 1;

Fig. 5 is a vertical section through the ionizing tube thereof; and

Fig. 6 is a wiring diagram of the ozone generator.

Figure 1:
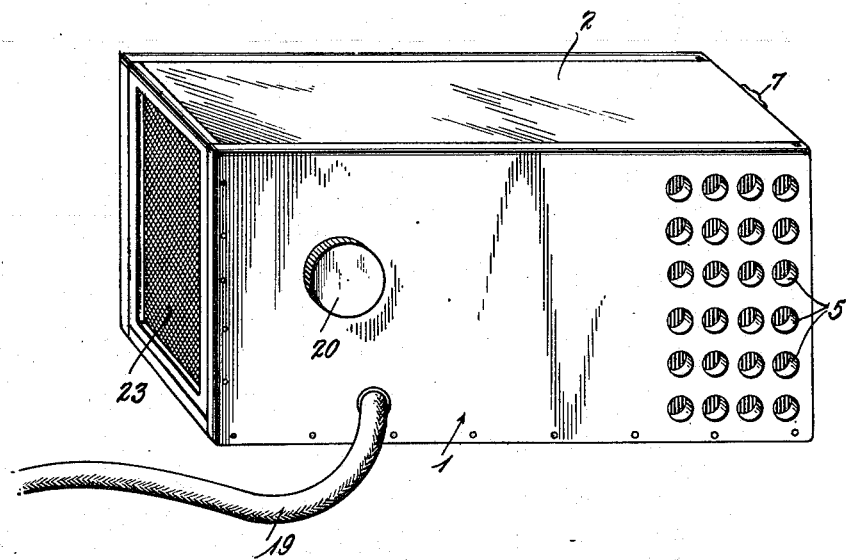
Figure 2:
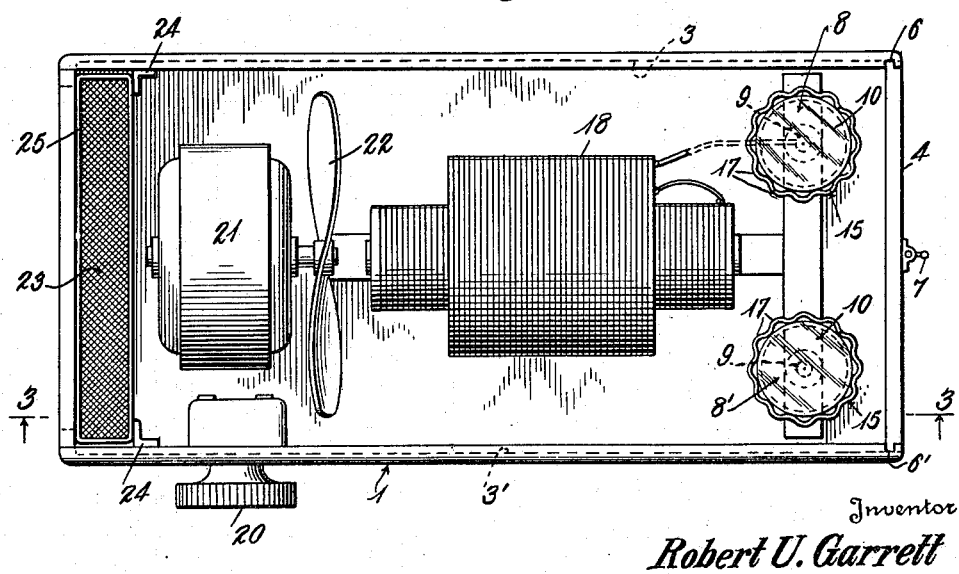
Fig. 2 is a top plan view of the generator shown in Fig. 1 with the cover removed.

Referring more particularly to the drawings, 1 designates a casing made of any suitable, durable, waterproof, non-oxidizable, and highly insulative material, such as Bakelite, phenol condensation products and the like. The top of this casing is provided with a cover, 2, adapted to slide in slots, 3 and $3^1$, (see Fig. 4). The right end 4 of the casing contains a plurality of spaced ventilating openings 5 and is also removable by means of slots 6 and $6^1$ (see Fig. 2). The top and end are provided with cooperative locking elements 7 by means of which they normally are held closed. Additional ventilating openings 5 are also formed in the sides of the casing to permit free egress of ozone therefrom. The removal of the cover and right end permits easy access to the interior of the ozone generator and especially to those parts which have to be cleaned or replaced, such as for instance the ionizing units 8 and $8^1$. It will be understood that whereas two units are shown in my preferred construction, any suitable number may be employed.

Referring to Fig. 5, an ionizing unit 8 consists essentially of an aluminum bolt 9 sealed in a glass tube 10 filled with finely divided granules of carbon 11, said glass tube being closed at the top and sealed at the bottom with a glass cement 12. The glass of which the tube is made is hard and homogeneous to provide a high dielectric value and of puncture-proof quality. The glass cement acts to retain the carbon particles in a fixed and tightly packed condition and at the same time functions to maintain the aluminum bolt 9 in a stationary position. This bolt screws into an aluminum base plate 13 located in countersunk recess 14 on the under side of the casing. The aluminum bolt, glass tube, and carbon granules make up the inner electrode. The outer electrode 15 is a corrugated and perforated tube of pure aluminum, sand blasted to give the greatest possible surface area. A plurality of spaced perforations 16 therein permit the maximum passage of air with the minimum of air resistance, parallel corrugations 17 also assisting in promoting the transfer of air therethrough.

A high voltage step-up transformer 18 is fixed to the floor of the casing adjacent to the ionizers 8 and 8¹, said transformer being of a type especially designed to carry extra heavy loads for protracted periods without damage or heating, owing to a specially constructed core. This transformer is necessary to raise ordinary commercial electricity, supplied through cable 19, to the high potential required for the efficient operation of the generator. The ionizer units 8 and 8¹ are connected to the transformer 18 by branched conductive leads 19a and 19b. A combination switch and rheostat 20 controls the voltage of the electricity supplied through cable 19.

An electric motor 21 is attached to the floor of the casing behind the transformer 18 and drives a centered fan 22, located in a position so that air will be blown across the transformer and ionizing units respectively. The motor 21 may be connected to any source of electrical energy not shown, but preferably is connected to the same source of power on the transformer.

The fan draws air through a demountable air filter 23 attached by sliding into a bracket 24 located in the left end of the casing. This air filter is of glass fiber enclosed in a rectangular frame 25 and coated with a dust retaining varnish. It is relatively inexpensive, and the sliding mounting permits the facile replacement thereof when the same has become unfit for use. In viewing the foregoing it will be observed that air is drawn through the filter 23 by the fan 22 which blows a cooling stream thereof across the transformer 18 and upon the ionizing units 8 and 8¹. The ozone formed is forced from the corrugated and perforated surfaces of the units and blown in a steady stream through the ventilator apertures 5 at the end of the casing 1.

The wiring diagram (Figure 6) is of the simplest possible type and consists of a low voltage circuit through the switch and rheostat 20 and the primary side of the step-up transformer 18. The secondary side of the transformer is connected at one end to the inside electrodes 10 of each ionizing unit and at the other end to the outside electrodes 14, this circuit being grounded to the case.

By manipulation of the rheostat 20 the switch may be turned on and the ozone output of the units 8 and 8¹ varied as desired. The principle of operation resides in the deposition of positive ions on the inside of the dielectric tube and accumulation thereof on the carbon granules 11. The efficiency output of the ozone generator depends a great deal on the amount of discharge surface available and the carbon granules 11 provide an improved electrode, as the many facets thereof provide a large contact surface so as to produce a highly efficient "corona" and discharge effect. The negative ions form on the outer electrode 15 and are released and circulated by the moving stream of air. The increased amount of surface contact obtained through sand blasting the electrode 15 permits a larger volume of negative ions for a given amount of electrostatic intensity, while the corrugated and perforated design of the outer electrode permits a larger amount of surface and freedom of air currents to insure rapid transfer of the ions to thereby facilitate the economical production of ozone.

I claim:

1. In an ozone generating device, an ozonizing unit having an inner electrode comprising a glass cylinder, a metal electrode within the cylinder and carbon granules filling the space between the electrode and the cylinder, and an outer electrode comprising a cylindrical metal shell surrounding the glass member and provided with vertically extending corrugations and perforations to permit free circulation of air.

2. In an ozone generating device having an inner electrode that comprises a glass cylinder, an electrode within the cylinder and carbon granules filling the space between the electrode and the cylinder, an outer electrode comprising a corrugated and perforated sheet metal cylinder surrounding the glass cylinder, a case enclosing the ozonizing unit so formed and having openings adjacent to the unit to permit the escape of air, an opening remote from said unit to permit the entrance of air, filter means for filtering the incoming air at the inlet opening, a fan within said casing for circulating air therethrough, and an encased transformer within said casing arranged so as to be exposed to the air current created by the fan and be cooled thereby, said transformer supplying current to the ozonizing units.

3. In an ozone generating device, the combination of an inner electrode comprising a glass cylinder, a mushroom-shaped metal conducting member within the cylinder and carbon granules contacting said conducting member and filling the space between the member and the cylinder, and an outer electrode surrounding the glass cylinder.

ROBERT U. GARRETT.